(12) United States Patent
Grosseruschkamp

(10) Patent No.: US 10,124,384 B2
(45) Date of Patent: Nov. 13, 2018

(54) DEVICE AND METHOD FOR PRODUCING AT LEAST PARTIALLY CLOSED PROFILES OR TUBULAR COMPONENTS FROM METAL SHEET

(75) Inventor: Thomas Grosseruschkamp, Diuisbug (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 588 days.

(21) Appl. No.: 14/390,719

(22) PCT Filed: Apr. 3, 2012

(86) PCT No.: PCT/EP2012/056066
§ 371 (c)(1),
(2), (4) Date: Jan. 28, 2015

(87) PCT Pub. No.: WO2013/149653
PCT Pub. Date: Oct. 10, 2013

(65) Prior Publication Data
US 2015/0129556 A1    May 14, 2015

(51) Int. Cl.
B23K 31/02  (2006.01)
B23K 11/04  (2006.01)
B23K 26/00  (2014.01)
B23K 11/00  (2006.01)
B21D 5/02   (2006.01)
B21D 9/05   (2006.01)
B21D 41/00  (2006.01)
(Continued)

(52) U.S. Cl.
CPC ............ B21D 5/015 (2013.01); B23K 26/262 (2015.10); B23K 31/027 (2013.01)

(58) Field of Classification Search
None
See application file for complete search history.

(56) References Cited

U.S. PATENT DOCUMENTS 3,702,502 A * 11/1972 Kelleher ............... B21D 5/002
                                                        33/520
3,703,094 A * 11/1972 Cree, Jr. ................ B21D 5/01
                                                        72/389.3
(Continued)

FOREIGN PATENT DOCUMENTS

CN      1148822 A      4/1997
DE      212662 A1      8/1984
(Continued)

Primary Examiner — Ibrahime A Abraham
Assistant Examiner — Gyounghyun Bae
(74) Attorney, Agent, or Firm — The Webb Law Firm

(57) ABSTRACT

The invention relates to a device and method for producing at least partially closed profiles from metal sheet, having a first tool part, a second tool part, and at least one supporting core. The insertion movement of the supporting core between the bending jaws is limited by a stop and, in its insertion position limited by the stop, protrudes with respect to the bending jaws in the direction of the die, in that the supporting core is arranged on a carrier that is movable relative to the die, and in that the bending jaws are assigned at least one displacement element connected rigidly thereto, the displacement element coming into contact with the carrier when the bent metal sheet portion engages around the supporting core.

11 Claims, 7 Drawing Sheets

(51) Int. Cl.
  *B21J 13/10* (2006.01)
  *B21D 5/01* (2006.01)
  *B23K 26/262* (2014.01)

(56) References Cited

U.S. PATENT DOCUMENTS

| | | | | |
|---|---|---|---|---|
| 3,880,038 A * | 4/1975 | Mangos | ........... | B21D 37/10 |
| | | | | 83/685 |
| 3,954,218 A * | 5/1976 | van Dijk | ........... | B21D 53/08 |
| | | | | 219/104 |
| 4,197,441 A * | 4/1980 | Rudd | ........... | B23K 13/02 |
| | | | | 219/106 |
| 4,223,196 A * | 9/1980 | Erlandson | ........... | B23K 13/046 |
| | | | | 219/61.2 |
| 4,362,921 A * | 12/1982 | Rudd | ........... | B23K 11/093 |
| | | | | 219/61.2 |
| 4,445,357 A | 5/1984 | Powers et al. | | |
| 4,484,703 A * | 11/1984 | Kawasaki | ........... | B21D 51/16 |
| | | | | 228/144 |
| 4,510,789 A * | 4/1985 | Tomioka | ........... | B21D 5/002 |
| | | | | 72/384 |
| 4,553,420 A * | 11/1985 | Fierkens | ........... | B21D 5/00 |
| | | | | 140/105 |
| 4,590,783 A * | 5/1986 | Tanaka | ........... | B21D 13/02 |
| | | | | 72/348 |
| 4,739,642 A * | 4/1988 | Redman | ........... | B21C 37/28 |
| | | | | 72/306 |
| 4,950,099 A * | 8/1990 | Roellin | ........... | B62D 33/044 |
| | | | | 403/348 |
| 4,971,239 A * | 11/1990 | Tyler | ........... | B21C 37/185 |
| | | | | 219/61.3 |
| 5,012,664 A * | 5/1991 | Hembree | ........... | H01L 21/67138 |
| | | | | 140/105 |
| 5,024,641 A * | 6/1991 | Boisseau | ........... | B31B 1/00 |
| | | | | 493/143 |
| 5,454,504 A * | 10/1995 | Sturrus | ........... | B60R 19/03 |
| | | | | 228/17 |
| 5,526,668 A * | 6/1996 | Futamura | ........... | B21D 43/05 |
| | | | | 29/33 Q |
| 5,816,991 A * | 10/1998 | Sato | ........... | B65D 5/5069 |
| | | | | 493/167 |
| 5,829,666 A * | 11/1998 | Takeda | ........... | B21C 37/0803 |
| | | | | 219/121.64 |
| 6,694,616 B1 * | 2/2004 | McKenna | ........... | B21C 37/296 |
| | | | | 29/890.14 |
| 7,117,708 B2 * | 10/2006 | Yamano | ........... | B21D 5/01 |
| | | | | 72/347 |
| 7,552,613 B1 * | 6/2009 | Chuan | ........... | B21D 5/01 |
| | | | | 72/389.3 |
| 8,001,689 B2 * | 8/2011 | Lindgren | ........... | B21D 22/02 |
| | | | | 29/897.2 |
| 8,061,034 B2 * | 11/2011 | Mellis | ........... | B21D 5/08 |
| | | | | 29/897.2 |
| 8,459,076 B2 * | 6/2013 | Flehmig | ........... | B21C 37/08 |
| | | | | 72/380 |
| 8,733,145 B1 * | 5/2014 | Chada, Jr. | ........... | B21C 37/14 |
| | | | | 72/363 |
| 9,248,487 B2 * | 2/2016 | Daimaru | ........... | B21D 22/02 |
| 2001/0013239 A1 * | 8/2001 | Yamano | ........... | B21D 5/00 |
| | | | | 72/350 |
| 2002/0162297 A1 | 11/2002 | Graber | | |
| 2007/0056347 A1 * | 3/2007 | Leland | ........... | B21D 5/0209 |
| | | | | 72/481.1 |
| 2009/0205387 A1 * | 8/2009 | Durney | ........... | B21D 5/08 |
| | | | | 72/178 |
| 2010/0122563 A1 * | 5/2010 | Durney | ........... | B21D 11/08 |
| | | | | 72/379.2 |
| 2010/0193064 A1 * | 8/2010 | Takada | ........... | B21C 37/0803 |
| | | | | 138/156 |
| 2010/0242565 A1 | 9/2010 | Flehmig et al. | | |
| 2010/0251795 A1 | 10/2010 | Bruggenbrock et al. | | |
| 2011/0042369 A1 * | 2/2011 | Ishiguro | ........... | B21D 37/16 |
| | | | | 219/539 |
| 2011/0174868 A1 * | 7/2011 | Higai | ........... | B21D 5/10 |
| | | | | 228/136 |
| 2012/0180542 A1 * | 7/2012 | Golovashchenko | ... | B21D 19/08 |
| | | | | 72/57 |

FOREIGN PATENT DOCUMENTS

| | | |
|---|---|---|
| DE | 102007021798 A1 | 11/2008 |
| DE | 102009003668 A1 | 9/2010 |
| DE | 102010037533 A1 | 3/2012 |
| JP | 56053824 A * | 5/1981 |
| JP | 2011104653 A | 6/2011 |

* cited by examiner

DEVICE AND METHOD FOR PRODUCING AT LEAST PARTIALLY CLOSED PROFILES OR TUBULAR COMPONENTS FROM METAL SHEET

CROSS-REFERENCE TO RELATED APPLICATION

This application is the United States national phase of International Application No. PCT/EP2012/056066 filed Apr. 3, 2012, the disclosure of which is hereby incorporated in its entirety by reference.

BACKGROUND OF THE INVENTION

Field of the Invention

The invention relates to a device for producing at least partially closed profiles (slot profiles) or tubular components from metal sheet, with a first tool part having a die, a second tool part having bending jaws and at least one supporting core, which is insertable between the bending jaws in contact with a cut-to-size metal sheet portion formed in a U-shape. Furthermore, the invention relates to a method for producing an at least partially closed profile (slot profile) or a tubular component from metal sheet.

Description of Related Art

To produce at least partially closed profiles (slot profiles) or semi-finished products, continuous or discontinuous forming methods can be used. The continuous forming takes place, for example, by roll forming. Discontinuous methods are recommended when continuous roll forming cannot be applied due to a complex profile geometry or semi-finished product geometry. For example, so-called U-O forming is known for the discontinuous production of at least partially closed profiles or semi-finished products.

The production of three-dimensionally formed components from metal sheet by the follow-on composite method belongs to the prior art (see, for example, US 2002/0162297 A1, FIGS. 6 to 8).

When producing components by deep drawing in follow-on composite tools, sometimes an uncontrolled springback of formed component portions occurs, so that in this case the components obtained do not have the required dimensional stability or dimensional accuracy. One known measure, by means of which an uncontrolled springback of relevant component portions can be counteracted, is calibration, in which relevant component regions are slightly formed again to improve the dimensional stability.

In vehicle construction, closed profiles made of metal sheet are used as structural components, for example as bumpers and hollow carriers absorbing impact energy. In order to prevent a premature failure of such components, internal stresses due to production are to be minimised in these components.

SUMMARY OF THE INVENTION

The object of the present invention is to provide a device and a method for producing at least partially closed profiles or tubular components from metal sheet, with which such profiles or components can be efficiently produced with high dimensional stability and without, or with only slight, internal stresses.

According to a first teaching of the present invention, the object indicated above is achieved with respect to a device of the type mentioned at the outset in that the insertion movement of the supporting core between the bending jaws is limited by a stop and the supporting core, in its insertion position limited by the stop, protrudes in the direction of the die in relation to the bending jaws, wherein the supporting core is arranged on a carrier that is movable relative to the die, and wherein the bending jaws are assigned at least one displacement element rigidly connected thereto, which touches the carrier when the bent metal sheet portion engages around the supporting core, and, upon continued movement of the bending jaws in the direction of the die, displaces the carrier and/or the carrier is moved so that the profile or component formed from the metal sheet portion is introducible into the die for the purpose of its calibration and/or compression with the supporting core.

Furthermore, the object indicated above is achieved according to the invention with respect to a generic method in that in a band-like metal sheet, a blank to be formed is cut free so the blank remains connected to the band-like metal sheet by means of at least two connecting webs, front and rear edge regions, viewed in the transporting direction, of the blank connected to the band-like metal sheet are bent off, so the blank is preformed in a substantially U-shape, the blank connected to the band-like metal sheet and preformed in this manner is formed into an at least partially closed profile or tubular component by means of bending jaws and at least one supporting core, which can be insertably positioned between the bending jaws and is arranged on a carrier that is movable relative to a die, and the profile or component with the supporting core arranged therein, with movement of the carrier relative to the die, is introduced into a recess of the die and is thereby calibrated and/or compressed by means of said die.

Owing to the method according to the invention or by means of the device according to the invention, springback-free or substantially springback-free slot profiles can be efficiently produced in a tool, which is preferably integrated in a follow-on composite press. These spring back-free slot profiles can then be further machined by welding their longitudinal edges in a butt joint without expensive clamping technology to form a closed profile. Not only can an uncontrolled springback of portions of the slot profile produced be counteracted by means of the device according to the invention or the method according to the invention, but, in particular, internal stresses in the component produced can be minimised by the calibration and/or compression of the longitudinal edge region of the slot profile in the recess of the die. If the component is, for example, an impact-absorbing component of a motor vehicle, relevant to a rear-end collision, a premature component failure can be counteracted by the minimisation according to the invention of the internal stresses of the component.

An advantageous embodiment of the device according to the invention provides that a movable pressure piece is arranged between the bending jaws, said pressure piece being moved with the supporting core upon bending of the metal sheet portion by means of the bending jaws, the pressure piece preferably being resiliently mounted and preferably being displaced by the supporting core. The pressure piece takes on the function of a holding-down device, whereby a controlled bending and/or a perfect forming of the region opposing the longitudinal seam is possible. As an alternative to the resilient mounting of the pressure piece, all known means are possible for actively activating or driving the pressure piece, for example a hydraulic and/or pneumatic drive or a corresponding activation device.

A further advantageous embodiment of the device according to the invention is characterised in that the carrier is provided with a guide supporting the supporting core, said guide having at least two guide portions that are spaced apart from one another, in which channel-shaped guide paths that align with one another are configured to receive the supporting core, the die being arranged between the two guide portions. As a result a reliable and robust support of the displaceable supporting core is achieved. In this case, the at least two guide portions of the supporting core that are spaced apart from one another may be exchangeably mounted on the carrier that can be moved relative to the die, so that, if necessary, by means of an exchange of the guide portions and the supporting core for a supporting core that is configured geometrically differently and guide portions suitable for this, various slot profiles can be produced on the device according to the invention. The bending jaws and the pressure piece, which is optionally movably arranged therebetween and preferably resiliently mounted, are mounted, preferably also in an exchangeable manner, for this purpose on a plate or the like of the second tool part.

A further advantageous embodiment of the device according to the invention provides that the carrier, on which the supporting core is arranged, is resiliently supported on a base plate, in particular by means of a large number of spring elements, preferably lower air pins. By means of suitable spring elements, for example lower air pins, a spring force can be reliably defined or preferably flexibly adjusted, said spring force being greater than the force required to bend a metal sheet that has been cut free and preformed in a U-shape, so that it engages around the supporting core after this bending as a virtually closed slot profile. Alternatively, all current means are possible as the drive, or to activate the carrier, for example a hydraulic and/or pneumatic drive or a corresponding activation device.

A further preferred embodiment of the device according to the invention provides that downwardly protruding spacer elements are provided on the lower side of the carrier, on which the supporting core is arranged. This embodiment allows the thickness of the carrier to be able to be reduced to an expedient amount without the stability of the device, in particular of the carrier, being disadvantageously impaired thereby. A substantial over-dimensioning of the carrier, which would give rise to unnecessary material costs and would involve the support and movement of an unnecessarily high mass, can thus be avoided. Moreover, the spacer elements are preferably height-adjustable. As a result, an optimal adjustment of the stop position of the spacer elements or of the carrier, on which the supporting core is arranged, is possible relative to the die.

In a further embodiment of the device according to the invention, the bending jaws and the at least one displacement element are connected to one another by means of a head plate. This embodiment is not only favourable in terms of manufacturing, but it also optionally allows for a simple exchange of the bending jaws and the at least one displacement element for bending jaws that are configured geometrically differently and displacement elements (displacers) suitable for the bending jaws, so differently configured slot profiles can be produced if necessary on the device according to the invention. The displacement element(s) (displacers) are preferably bolt-like and/or length-adjustable.

A structurally simple and simultaneously reliable guidance of the pressure piece movably arranged between the bending jaws is produced when, according to a further preferred embodiment of the device according to the invention, the head plate, on which the bending jaws are provided or fastened, has bores or openings for the guidance of guide pins connected to the pressure piece.

It may be desired for different reasons that the tubular components or slot profiles produced using the device according to the invention have a cross-sectional shape that changes in the longitudinal direction. One reason for this may, for example, be an increase in the flexural rigidity of the profile or component at a constant or reduced component weight. A further reason may, for example, be the adjustment of a defined deformation behaviour in crash-relevant components. For this purpose, an advantageous configuration of the device according to the invention provides that the supporting core has two, three or more portions with a different cross-sectional shape, the diameter of the cross-sectional shape in the case of three or more portions increasing step-wise or continuously from a smallest diameter to a largest diameter, and the bending jaws limiting a recess which receives the supporting core with a metal sheet portion resting thereon and is widened step-wise or continuously in accordance with the supporting core.

With respect to the production of tubular slot profiles with comparatively complex geometries, it is furthermore advantageous if the device according to the invention has two supporting cores, which may be symmetrical or may differ with respect to their cross-sectional shape. The introduction or moving back of the supporting cores takes place here at the opposing ends of the respective slot profile.

Here, the second supporting core may have two, three or more portions with a different cross-sectional shape, the diameter of the cross-sectional shape in the case of three or more portions increasing step-wise or continuously from a smallest diameter to a largest diameter, and the bending jaws limiting a recess which receives the second supporting core with a metal sheet portion resting thereon and is widened step-wise or continuously in accordance with the second supporting core.

According to a further advantageous embodiment, the device according to the invention is not limited to the production of a single component per stroke as it can preferably also be configured as a double (follow-on composite) tool for the simultaneous forming of two components, i.e., of two at least partially closed profiles or tubular components.

BRIEF DESCRIPTION OF THE DRAWINGS

The invention will be described in more detail below with the aid of drawings showing embodiments, in which, schematically.

DETAILED DESCRIPTION OF THE INVENTION

Figure 1:
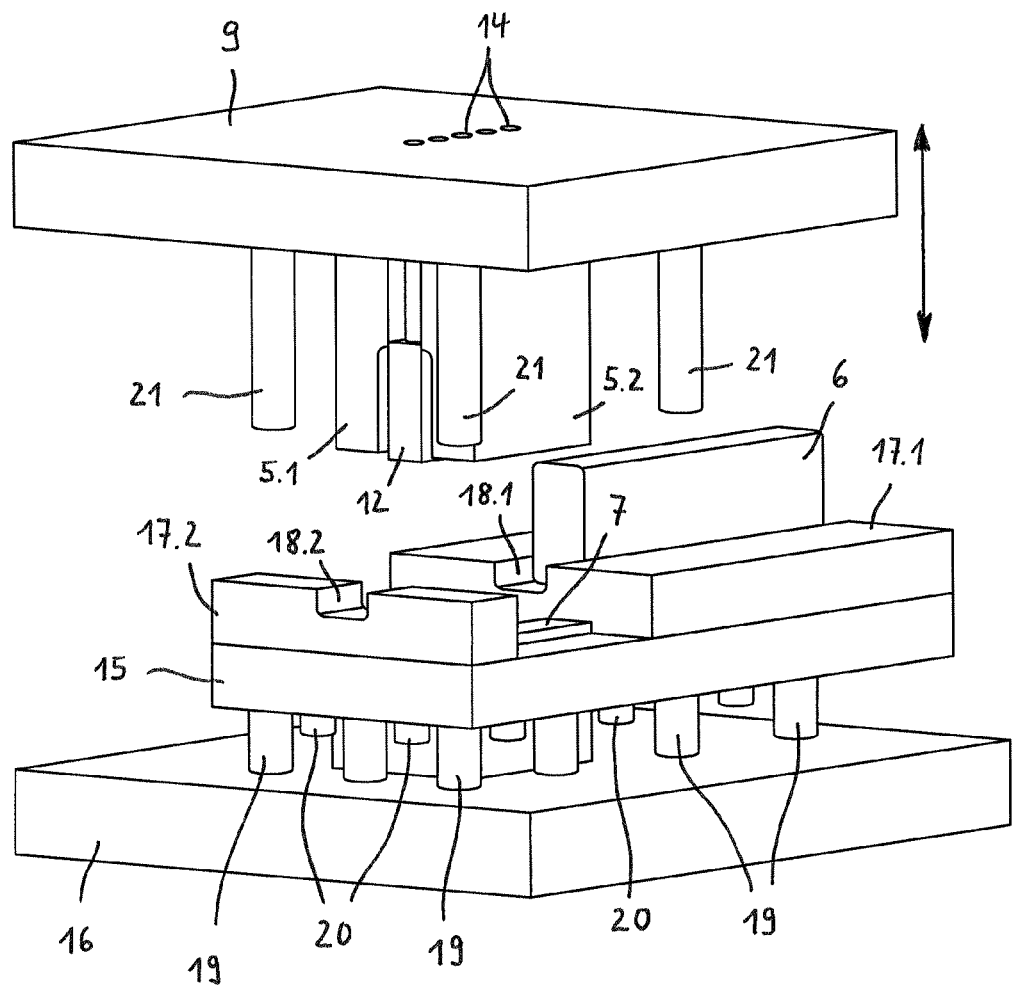
FIG. 1 and FIG. 2 show an embodiment of a device according to the invention in a perspective view and in a side view, respectively.
Figure 2:
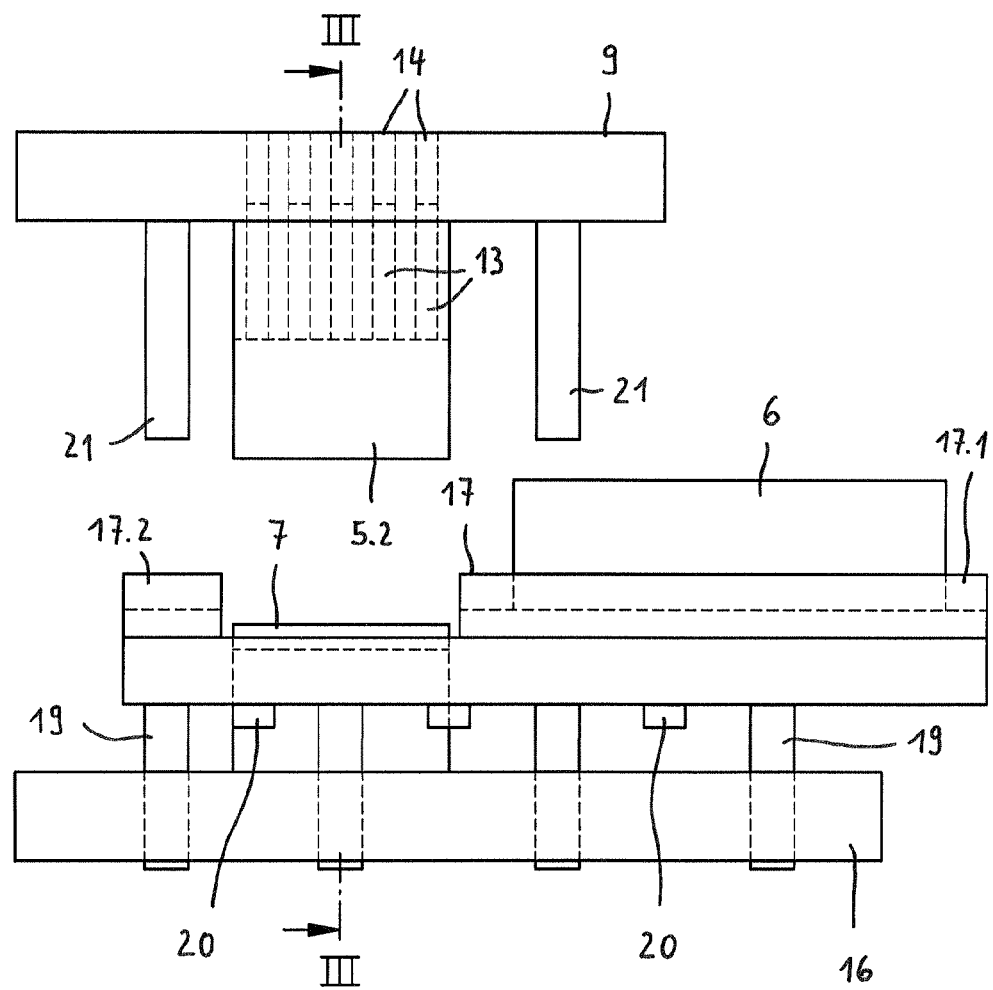
Figure 9:
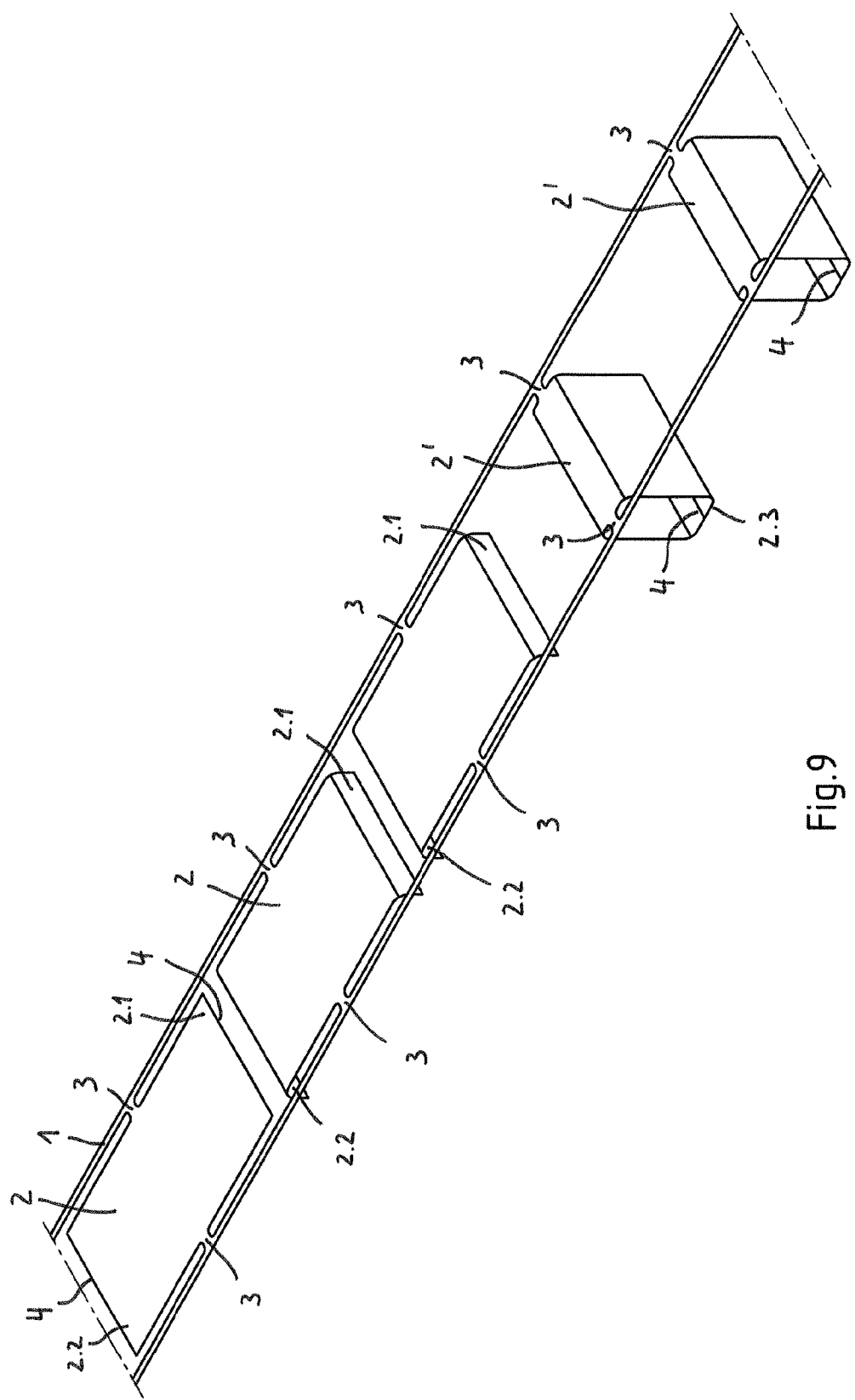
FIG. 9 shows a strip-like or band-like metal sheet, in which sheet portions to be formed are cut free, preformed or formed to form a closed profile (tubular component), in a perspective view.
Figure 10:
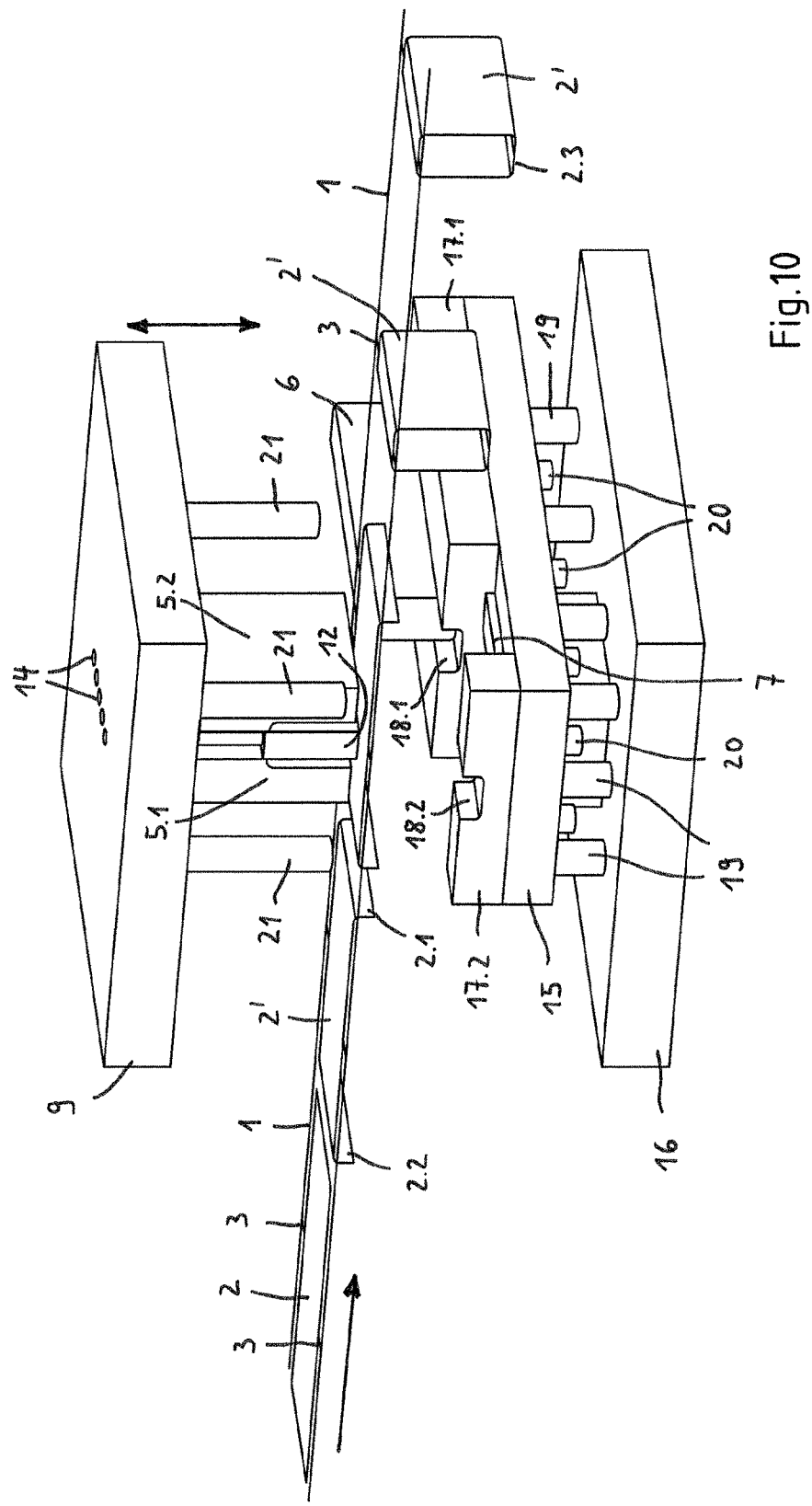
FIG. 10 shows a device according to the invention, which is configured as a follow-on composite tool for a follow-on composite press, and a strip-like or band-like metal sheet according to FIG. 9, in a perspective view.

FIGS. 1 and 2 show an embodiment of a device according to the invention for producing at least partially closed profiles or tubular components from metal sheet. The device will be, or is, integrated in a follow-on composite press, in which blank-like workpieces 2 are initially cut free from a strip-like or band-like metal sheet 1 by means of stamping tools (not shown) or the like (see FIGS. 9 and 10).

The workpieces (blanks) 2 that have been cut free remain connected to the strip-like or band-like metal sheet 1 by two connecting webs 3 during their forming in the device according to the invention. The connecting webs 3, which remain on the sides of the respective workpiece 2 running transversely to the transporting direction of the metal sheet band 1, can be separated from the metal sheet band 1 after conclusion of a calibration of the component 2' formed by bending or optionally only after welding of the longitudinal edges 4 of the respective tubular component 2'.

Before entry into the device according to the invention, the front and rear edge regions 2.1, 2.2, viewed in the transporting direction, of the blank 2 connected to the metal sheet band 1 are bent, so the blank 2 then has a substantially U-shaped cross-sectional shape as the preform. The bent edge regions 2.1, 2.2 of the blank 2 are relatively narrow here. Placed next to one another they together form one side, for example a base 2.3, of the hollow profile (component) 2' to be produced.

The blank 2 connected to the metal sheet band 1 and preformed in this manner is then formed into an at least partially closed profile or tubular component 2' in the device according to the invention by means of bending jaws 5.1, 5.2 and at least one supporting core 6 that is insertably positionable between the bending jaws.

The device according to the invention, which can also be called a follow-on composite tool, comprises a first tool part having a die 7, a second tool part having the bending jaws 5.1, 5.2 and the at least one supporting core (slider) 6. The bending jaws 5.1, 5.2 arranged at a specific spacing from one another define a gap 8, in which the supporting core 6 can be inserted in contact with the sheet portion 2 that has been cut free and has been preformed in a U-shape.

The bending jaws 5.1, 5.2 are attached or releasably fastened to a head plate 9. The gap (hollow space) 8, which is limited by the bending jaws 5.1, 5.2 and into which the supporting core 6 can be inserted, passes into a narrower gap (hollow space) 10. The insertion movement of the supporting core 6 is limited by the shoulder defining a stop 11 between the wider gap 8 and the narrower gap 10.

A pressure piece (die inlay, holding-down device) 12 is arranged between the bending jaws 5.1, 5.2, said pressure piece preferably being resiliently mounted or supported on the head plate 9. The pressure piece 12, on insertion of the supporting core 6 into the wider gap 8 defined by the bending jaws 5.1, 5.2, is displaced therefrom into the narrower gap 10. The gap 8 and the supporting core 6 are dimensioned such that the supporting core protrudes in the direction of the die 7 relative to the bending jaws 5.1, 5.2 in its insertion position limited by the stop 11 (cf. FIG. 5). The pressure piece 12 can also be actively activated or driven by other current means, for example by hydraulic and/or pneumatic means.

The pressure piece 12 is provided with a row of pins (bolts) 13 spaced apart from one another, which are guided in a sliding manner in bores or openings 14, which are introduced adjacent to the narrower gap 10 between the bending jaws 5.1, 5.2 into the head plate 9.

The supporting core 6 is arranged on a carrier 15. The carrier 15 is plate-like or frame-like and preferably resiliently mounted on a base plate 16. The carrier 15 may, however, also be actively controlled or driven by other current means, for example by hydraulic and/or pneumatic means.

The carrier 15 is provided with a guide 17 supporting the supporting core 6. The guide 17 is, for example, formed from to guide portions 17.1, 17.2, which are spaced apart from one another and in which channel-like guide paths 18.1, 18.2 that align with one another are configured to receive the supporting core 6. One (17.1) of the guide portions is substantially longer here than the other guide portion 17.2. The length of the longer guide portion 17.1 preferably corresponds at least to the length of the supporting core 6 (see FIGS. 1 and 2). The length of the guide channel 18.2 of the shorter guide portion 17.2 is a fraction of the length of the supporting core 6 or of the guide channel 18.1 of the longer guide portion 17.1, for example less than ⅕ of the length of the longer guide portion 17.1.

The plate-like or frame-like carrier 15 is preferably resiliently supported on the base plate 16 by means of a large number of lower air pins 19 or alternative suspension elements. The carrier 15 can also be called a spring base. Attached to the resiliently mounted carrier 15 are spacer elements 20, which protrude in relation to the lower side thereof in the direction of the base plate 16. The carrier 15 has a window-like recess 15.1, which surrounds the die 7 mounted on the base plate 16 with play. The die 7 is arranged between the two guide portions 17.1, 17.2 and preferably releasably mounted on the base plate 16. The carrier (spring base) 15 is thus movable relative to the die 7 with the supporting core 8 held thereon in the guide 17.

The head plate 9 is provided with displacement elements 21 on its lower side next to the bending jaws 5.1, 5.2. The displacement elements (displacers) 21 are preferably pin-like or bolt-like. When the follow-on composite tool according to the invention is closed, the displacement elements 21 touch the carrier 15, which is preferably resiliently mounted on the base plate 16, or the guide portions 17.1, 17.2, which are connected to the carrier and hold the supporting core 6.

The mode of functioning of the follow-on composite tool according to the invention will be described below with the aid of FIGS. 3 to 8.

Figure 3:
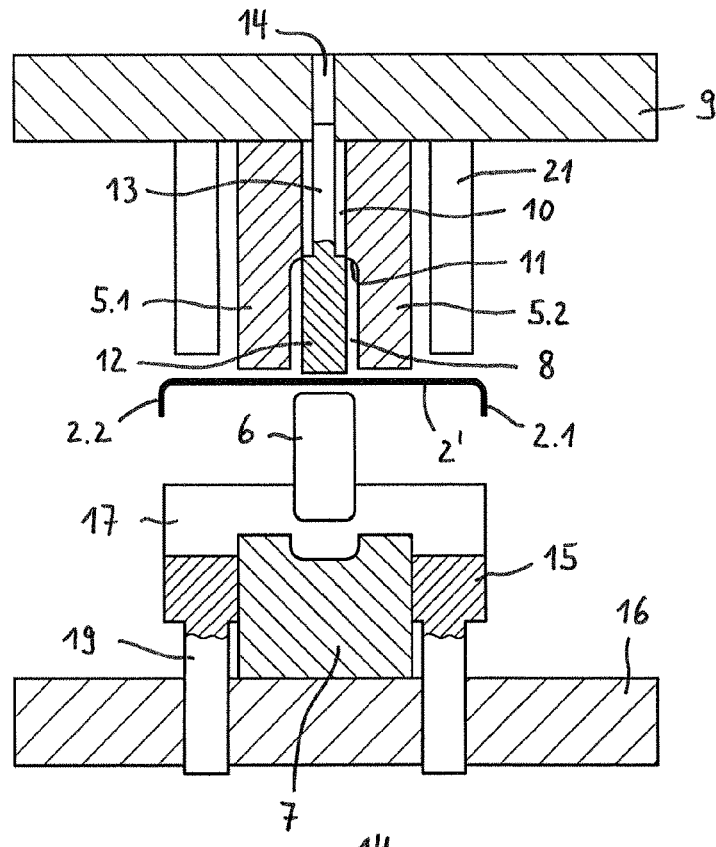
FIG. 3 is a sectional view of the device along the section line III-Ill of FIG. 2 with a metal sheet portion that is preformed in a U-shape.

FIG. 3 shows a starting position, in which the follow-on composite tool is open, in that the upper tool part has been moved up relative to the lower tool part. The strip-like metal sheet 1 is located with the sheet portion 2, which has been cut free and has been preformed in a U-shape and which is still integrally connected to the strip-like metal sheet 1 by means of connecting webs 3 (cf. FIG. 9), in the working region of the tool, the strip-like metal sheet 1 being raised to a specific transporting height. The supporting core 6 provided with a drive (not shown) is located in a drawn-back position on the larger portion 17.1 of the guide 17. The preferably spring-loaded pressure piece (die inlay) 12 is located in the wider gap 8 defined by the bending jaws 5.1, 5.2 and protrudes slightly in relation to the end faces 5.3, 5.4 of the bending jaws 5.1, 5.2 facing the die. The spring base (carrier) 15 with the supporting core 6 guided thereon is in its raised position maximally spaced apart from the base plate 16.

Figure 4:
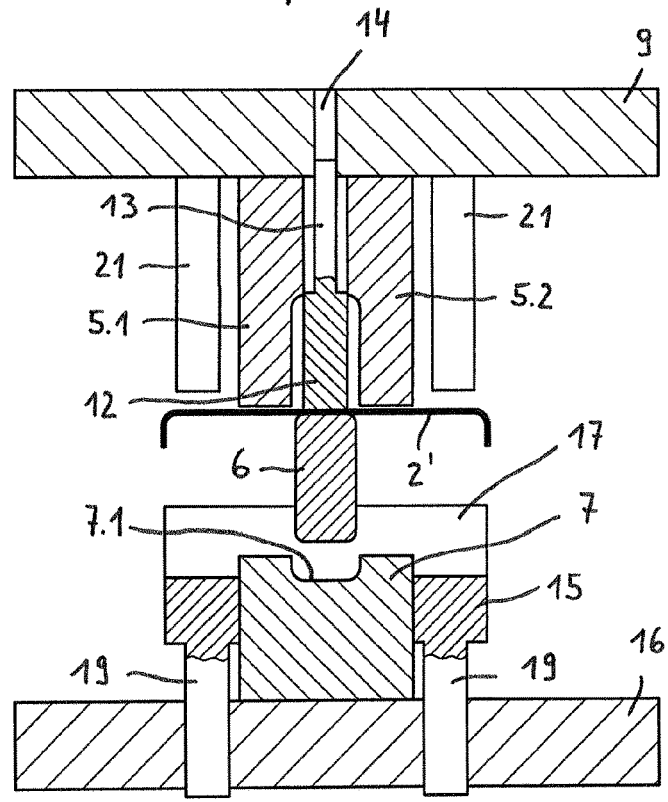
FIG. 4 to FIG. 6 are sectional views of the device during various instants when a method according to the invention is being carried out to produce an at least partially closed profile or tubular component from metal sheet.

FIG. 4 shows a situation in which the supporting core 6 is moved below the preformed sheet portion 2' so the supporting core 6 rests on the two portions 17.1, 17.2 of the guide 17 and bridges the window-like recess 15.1 of the plate-like carrier 15. The strip like metal sheet 1 has been lowered onto a working plane, so the preformed sheet portion 2' rests on the supporting core 6. In addition, the upper tool part has been lowered, so the preformed sheet portion 2' is clamped between the supporting core (slider) 6 and pressure piece (die inlay) 12. The counter-pressure exerted by the lower air pins 19 (or the corresponding counter-force) is greater than the force required to bend the preformed sheet portion 2' plus the force exerted by the pressure piece 12.

Figure 5:
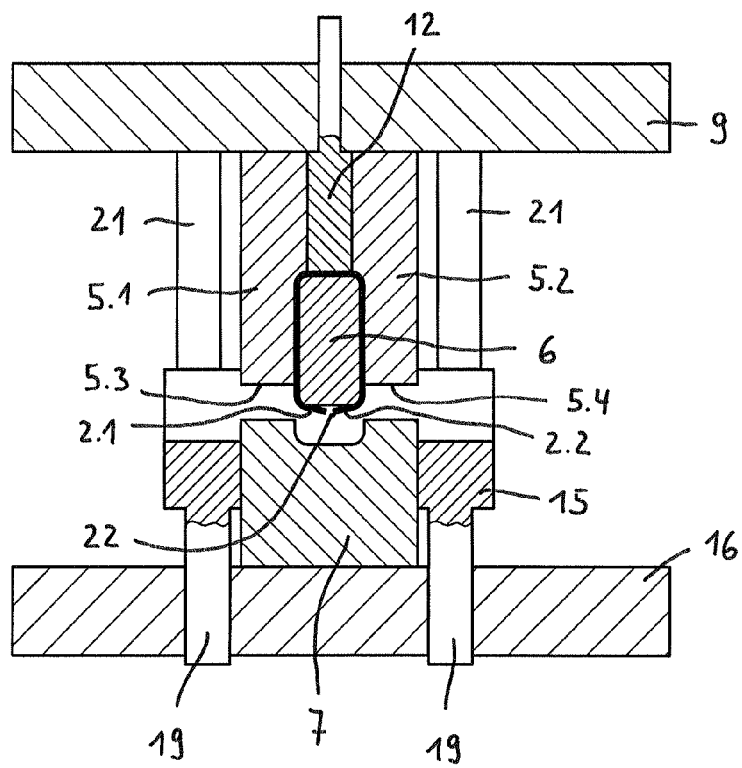
Figure 6:
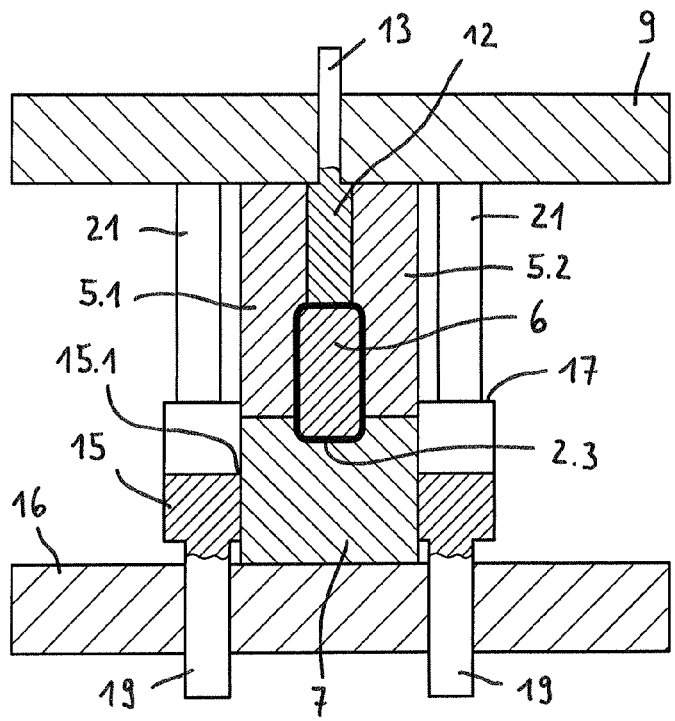
Figure 7:
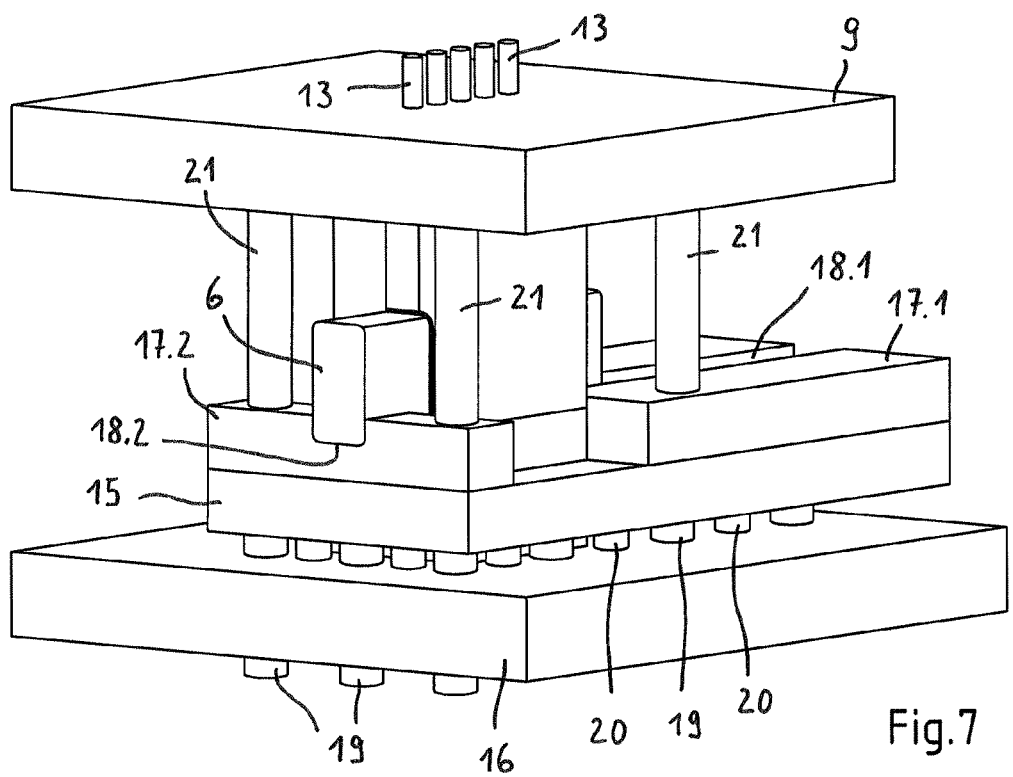
FIG. 7 shows the device in a perspective view at the instant according to FIG. 6.

FIG. 5 then shows the situation, in which the preformed sheet portion 2' has been bent, in that the upper tool part has been lowered to such an extent that the supporting core 6 with the sheet portion 2' is inserted in the gap (hollow space) 8 between the bending jaws 5.1, 5.2 and rests on the stop 11 defined by the bending jaws. At the same time, the pressure piece 12 clamping the sheet portion 2' has been displaced into the upper, narrower gap (hollow space) 10. The guide elements 13 connected to the pressure piece 12 now protrude in relation to the upper side of the head plate 9. Furthermore, the displacement elements (displacers) 21 have been placed, in this situation, on the guide 17 and therefore on the preferably resiliently mounted carrier 15. The longitudinal edges 4 of the slot profile 2' thus produced face one another on the lower side of the supporting core 6. The longitudinal edges 4 may touch one another here or be spaced apart from one another by a very narrow slot 22.

If the upper tool part is further lowered relative to the situation shown in FIG. 5, the displacement elements (displacers) 21, with displacement of the lower air pins 1.9 or compression of corresponding alternative spring elements, press against the guide 17 and therefore against the carrier 15. The carrier 15 is, or can be, displaced to such an extent in the direction of the base plate 16 until the spacer elements 20 bear on the base plate 16. In this case, the at least partially closed profile 2' with the supporting core 6 arranged therein is pressed into the recess 7.1 of the die 7 and thereby compressed or calibrated (see FIGS. 6 and 7). Not only is an uncontrolled springback counteracted in his manner but internal stresses in the component 2' can also thus be minimised.

The upper tool part is then raised again, the lower air pins 19 (or similar spring elements) pushing the carrier 15 back into its starting position.

Figure 8:
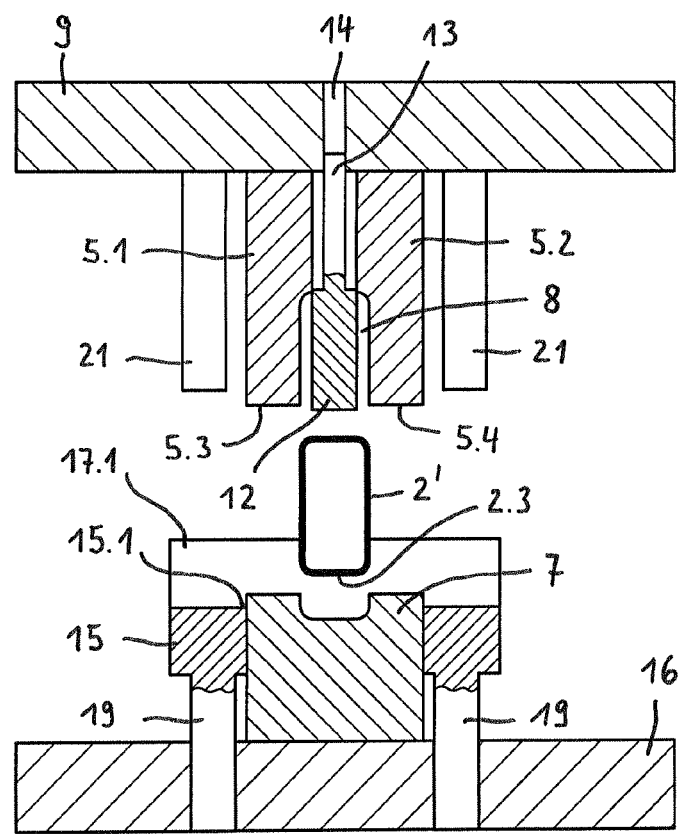
FIG. 8 shows the device in an open state in a sectional view with the completely formed profile or component.

Finally, the situation is shown in FIG. 8, in which the tool according to the invention is again located in its starting position. The supporting core (slider) 6 is moved back out of the working region and frees the tubular component or slot profile 2' produced, which is still connected by the connecting webs 3 to the strip-like metal sheet 1 (cf. FIG. 10).

The longitudinal edges 4 of the slot profile 2' are welded to one another in a butt joint into a closed hollow profile in a following process step, a laser welding device (not shown) preferably being used for this. The components 2' produced in this manner are preferably used as structural components in vehicle construction, for example as closed profiles for bumpers, so-called crash boxes, longitudinal beams, transverse beams, seat carrier profiles etc. The longitudinal edges 4 can optionally also be welded at a later instant in a separate device.

The implementation of the invention is not limited to the embodiments shown in the drawings and described above. Rather, numerous variants are conceivable, which, even with a configuration differing from the examples shown, make use of the invention disclosed in the accompanying claims. Thus, the method according to the invention also, for example, comprises embodiments, in which two supporting cores 6 are used, which have different cross-sectional shapes and are brought together from opposing sides and are moved apart after the forming of the profile or component. Furthermore, the method according to the invention also, for example, comprises embodiments, in which at least one of the supporting cores 6 has two, three or more portions with a different cross-sectional shape, the diameter of the cross-sectional shape, in the case of three or more portions of the supporting core, increasing step-wise or continuously from a smallest diameter to a largest diameter, and the bending jaws 5.1, 5.2 limiting a recess which receives the supporting core 6 with a metal sheet portion 2' resting thereon and is widened step-wise or continuously in accordance with the supporting core 6.

The invention claimed is:

1. A device for producing at least partially closed profiles or tubular components from a metal sheet, the device comprising: a first tool part having a die, a second tool part having bending jaws and at least one supporting core, which is insertable between the bending jaws in contact with a cut-to-size metal sheet portion formed in a U-shape, wherein the insertion movement of the supporting core between the bending jaws is limited by a stop defined by an inner shoulder of the bending jaws and the supporting core, in its insertion position limited by the stop, protrudes in the direction of the die in relation to the bending jaws, the supporting core being arranged on a carrier that is movable relative to the die, and the bending jaws being assigned at least one displacement element rigidly connected thereto, which touches the carrier when the bent metal sheet portion engages around the supporting core, and, upon continued movement of the bending jaws in the direction of the die, displaces the carrier and/or the carrier is moved so that the profile or component formed from the metal sheet portion is introducible into the die for the purpose of its calibration and/or compression with the supporting core, wherein the carrier is provided with a guide supporting the supporting core, said guide having at least two guide portions, which are spaced apart from one another and in which channel-shaped guide paths that align with one another are configured to receive the supporting core, the die being arranged between the two guide portions.

2. The device according to claim 1, wherein arranged between the bending jaws is a movable pressure piece, which is moved with the supporting core upon bending of the metal sheet portion by means of the bending jaws, the pressure piece preferably being resiliently mounted and preferably being displaced by the supporting core.

3. The device according to claim 2, wherein the bending jaws and the displacement element(s) are connected to one another by a head plate.

4. The device according to claim 3, wherein the head plate has bores or openings to guide guide pins connected to the pressure piece.

5. The device according to claim 1, wherein the carrier is resiliently supported on a base plate by means of a large number of spring elements, preferably lower air pins.

6. The device according to claim 5, wherein downwardly protruding spacer elements are provided on the lower side of the carrier.

7. The device according to claim 1, wherein it is configured as a follow-on composite tool for a follow-on composite press.

8. The device according to claim 1, wherein the supporting core has two, three or more portions with a different cross-sectional shape, the diameter of the cross-sectional shape in the case of three or more portions increasing step-wise or continuously from a smallest diameter to a largest diameter, and the bending jaws limiting a recess which receives the supporting core with a metal sheet portion resting thereon and is widened step-wise or continuously in accordance with the supporting core.

9. The device according to claim 1, wherein a second supporting core is present, which is symmetrical with the first supporting core or has a different cross-sectional shape to the first supporting core.

10. The device according to claim 9, wherein the second supporting core has two, three or more portions with a different cross-sectional shape, the diameter of the cross-sectional shape in the case of three or more portions increasing step-wise or continuously from a smallest diameter to a largest diameter, and the bending jaws limiting a recess which receives the second supporting core with a metal sheet portion resting thereon and is widened step-wise or continuously in accordance with the second supporting core.

11. The device according to claim 1, wherein it is configured as a double tool or double follow-on composite tool for the simultaneous forming of two at least partially closed profiles or two tubular components.

* * * * *

UNITED STATES PATENT AND TRADEMARK OFFICE
CERTIFICATE OF CORRECTION

PATENT NO. : 10,124,384 B2  
APPLICATION NO. : 14/390719  
DATED : November 13, 2018  
INVENTOR(S) : Thomas Grosseruschkamp Page 1 of 1

It is certified that error appears in the above-identified patent and that said Letters Patent is hereby corrected as shown below:

On the Title Page

Column 1, Item (75) Inventor, Line 1, delete "Diuisbug" and insert -- Duisburg --

In the Claims

Column 8, Line 66, Claim 4, delete "guide guide" and insert -- guide --

Signed and Sealed this  
Twenty-sixth Day of February, 2019

Andrei Iancu  
*Director of the United States Patent and Trademark Office*